US009352683B2

(12) United States Patent
Ignaczak et al.

(10) Patent No.: US 9,352,683 B2
(45) Date of Patent: May 31, 2016

(54) TRAFFIC DENSITY SENSITIVITY SELECTOR

(71) Applicant: Ford Global Technologies, LLC, Dearborn, MI (US)

(72) Inventors: Brad Alan Ignaczak, Canton, MI (US); Thomas Lee Miller, Ann Arbor, MI (US); Brian Bennie, Sterling Heights, MI (US); Randy Michael Freiburger, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/611,848

(22) Filed: Feb. 2, 2015

(65) Prior Publication Data
US 2015/0269842 A1 Sep. 24, 2015

Related U.S. Application Data

(60) Provisional application No. 61/969,123, filed on Mar. 22, 2014, provisional application No. 61/969,124, filed on Mar. 22, 2014, provisional application No. 61/969,126, filed on Mar. 22, 2014, provisional application No. 61/969,122, filed on Mar. 22, 2014.

(51) Int. Cl.
*G06G 7/76* (2006.01)
*G08G 1/00* (2006.01)
(Continued)

(52) U.S. Cl.
CPC .............. *B60Q 1/2611* (2013.01); *B60Q 1/38* (2013.01); *B60Q 1/44* (2013.01); *B60Q 1/50* (2013.01);
(Continued)

(58) Field of Classification Search
CPC .......... B60Q 1/2611; B60Q 1/38; B60Q 1/44; G01S 13/931; G01S 17/66; G01S 2013/9364; G01S 2013/9367; G01S 13/72; G01S 15/66; B60W 10/20; B60W 10/10; B60W 10/18; B60W 10/06; B60W 2710/10; B60W 2710/18; B60W 2710/20; B60W 2750/40; B60W 2710/06; G08G 1/166; G07C 5/008; G07C 5/085
See application file for complete search history.

(56) References Cited

U.S. PATENT DOCUMENTS 6,121,896 A 9/2000 Rahman
6,243,024 B1 6/2001 Yamabuchi et al.
(Continued)

FOREIGN PATENT DOCUMENTS

CN 1528616 A 9/2004
CN 201590159 U 9/2010
(Continued)

OTHER PUBLICATIONS

Great Britain Search Report dated Sep. 11, 2015 (4 pages).
(Continued)

*Primary Examiner* — Mary Cheung
(74) *Attorney, Agent, or Firm* — Frank MacKenzie; Bejin Bienenman PLC

(57) ABSTRACT

Data is collected related one or more objects proximate to a first vehicle, the one or more objects including a second vehicle. The collected data is used to generate a virtual map of the one or more objects including the second vehicle. It is determined that the second vehicle is likely to pass within a predetermined distance of the first vehicle, thereby identifying a threat of a collision. An action is initiated based on the threat. The predetermined distance is determined by comparing a current traffic density to a predetermined traffic density threshold.

20 Claims, 4 Drawing Sheets

(51) Int. Cl.

| | | |
|---|---|---|
| *B60Q 1/26* | (2006.01) | |
| *B60Q 1/38* | (2006.01) | |
| *B60Q 1/44* | (2006.01) | |
| *B60W 10/06* | (2006.01) | |
| *B60W 10/10* | (2012.01) | |
| *B60W 10/18* | (2012.01) | |
| *B60W 10/20* | (2006.01) | |
| *G01S 15/66* | (2006.01) | |
| *G01S 17/66* | (2006.01) | |
| *G07C 5/00* | (2006.01) | |
| *G08G 1/16* | (2006.01) | |
| *G01S 13/93* | (2006.01) | |
| *B60Q 1/50* | (2006.01) | |
| *G01S 13/72* | (2006.01) | |
| *G07C 5/08* | (2006.01) | |

(52) U.S. Cl.
CPC .............. *B60W 10/06* (2013.01); *B60W 10/10* (2013.01); *B60W 10/18* (2013.01); *B60W 10/20* (2013.01); *G01S 13/931* (2013.01); *G01S 15/66* (2013.01); *G01S 17/66* (2013.01); *G07C 5/008* (2013.01); *G08G 1/166* (2013.01); *B60W 2710/06* (2013.01); *B60W 2710/10* (2013.01); *B60W 2710/18* (2013.01); *B60W 2710/20* (2013.01); *B60W 2750/40* (2013.01); *G01S 13/72* (2013.01); *G01S 2013/9364* (2013.01); *G01S 2013/9367* (2013.01); *G07C 5/085* (2013.01)

(56) References Cited

U.S. PATENT DOCUMENTS

| | | | |
|---|---|---|---|
| 6,679,702 B1 * | 1/2004 | Rau | G09B 9/02 340/435 |
| 6,744,359 B1 | 6/2004 | Wasilewski et al. | |
| 6,832,156 B2 | 12/2004 | Farmer | |
| 7,036,390 B2 | 5/2006 | Tsuchihashi et al. | |
| 7,884,705 B2 * | 2/2011 | Nishimura | G08G 1/166 180/272 |
| 8,295,547 B1 | 10/2012 | Cangiani | |
| 9,079,571 B2 | 7/2015 | Trost et al. | |
| 2005/0090982 A1 | 4/2005 | Mead et al. | |
| 2007/0222639 A1 * | 9/2007 | Giles | G08G 1/07 340/907 |
| 2008/0122652 A1 | 5/2008 | Tengler et al. | |
| 2009/0157286 A1 * | 6/2009 | Saito | B60W 30/16 701/117 |
| 2009/0212935 A1 | 8/2009 | Luo et al. | |
| 2010/0007523 A1 * | 1/2010 | Hatav | G01C 21/26 340/901 |
| 2011/0190972 A1 | 8/2011 | Timmons et al. | |
| 2011/0234390 A1 | 9/2011 | Danner et al. | |
| 2011/0313665 A1 * | 12/2011 | Lueke | G01S 13/931 701/301 |
| 2012/0101711 A1 | 4/2012 | Furmston et al. | |
| 2013/0085636 A1 * | 4/2013 | You | B60W 30/06 701/25 |
| 2013/0173114 A1 * | 7/2013 | Pillai | B62D 15/026 701/41 |
| 2015/0065060 A1 | 3/2015 | Stahlin et al. | |
| 2015/0086175 A1 | 3/2015 | Lorenzetti | |
| 2015/0151753 A1 | 6/2015 | Clarke et al. | |

FOREIGN PATENT DOCUMENTS

| | | |
|---|---|---|
| CN | 202563691 U | 11/2012 |
| CN | 202923460 U | 5/2013 |
| CN | 202952877 U | 5/2013 |
| CN | 103208166 A | 7/2013 |
| DE | 102006019495 A1 | 10/2007 |
| DE | 102006036458 A1 | 2/2008 |
| DE | 102010027952 A1 | 12/2011 |
| DE | 102012014624 A1 | 1/2013 |
| FR | 2871915 A1 | 12/2005 |
| GB | 2350425 | 11/2000 |
| JP | S5247232 A | 4/1977 |
| JP | H08339500 | 12/1996 |
| JP | 2002260199 | 9/2002 |
| JP | 2013095404 A | 9/2007 |
| JP | 201276714 | 4/2012 |
| KR | 20040020706 | 3/2004 |
| KR | 20110007662 | 1/2011 |
| TW | 200843980 | 1/2005 |

OTHER PUBLICATIONS

Non-Final Office Action dated Oct. 5, 2015; U.S. Appl. No. 14/611,901; 17 pages.

Non-Final Office Action from Application No. 14611883 dated Jan. 29, 2016.

* cited by examiner

TRAFFIC DENSITY SENSITIVITY SELECTOR

RELATED APPLICATION

This application claims priority to Provisional Application Ser. No. 61/969,123 filed Mar. 22, 2014 entitled "Approach Warning for a Police Vehicle"; Provisional Application Ser. No. 61/969,124 filed Mar. 22, 2014 entitled "Approach Warning for a Police Vehicle"; Provisional Application Ser. No. 61/969,126 filed Mar. 22, 2014 entitled "Emergency Vehicle Maneuver Notification"; and Provisional Application Ser. No. 61/969,122 filed Mar. 22, 2014 entitled "Tracking a Suspect From a Vehicle", each of which provisional applications are hereby incorporated herein by reference in their respective entireties.

BACKGROUND

Police officers are at risk of being injured or killed when struck by passing vehicles while responding to roadway incidents. In some cases, the officer is directly struck by the passing vehicle while standing outside a cruiser (e.g., standing next to a vehicle on a road shoulder while processing a traffic ticket, accident, etc.). In others cases, a police cruiser or another vehicle is struck, pushing a vehicle into the officer. There are a variety of situations that can result in a passing vehicle striking the police officer, including driver distraction, driving under the influence of drugs or alcohol, loss of consciousness, loss of vehicle control, etc.

DRAWINGS

DETAILED DESCRIPTION

System Overview

Figure 2A:
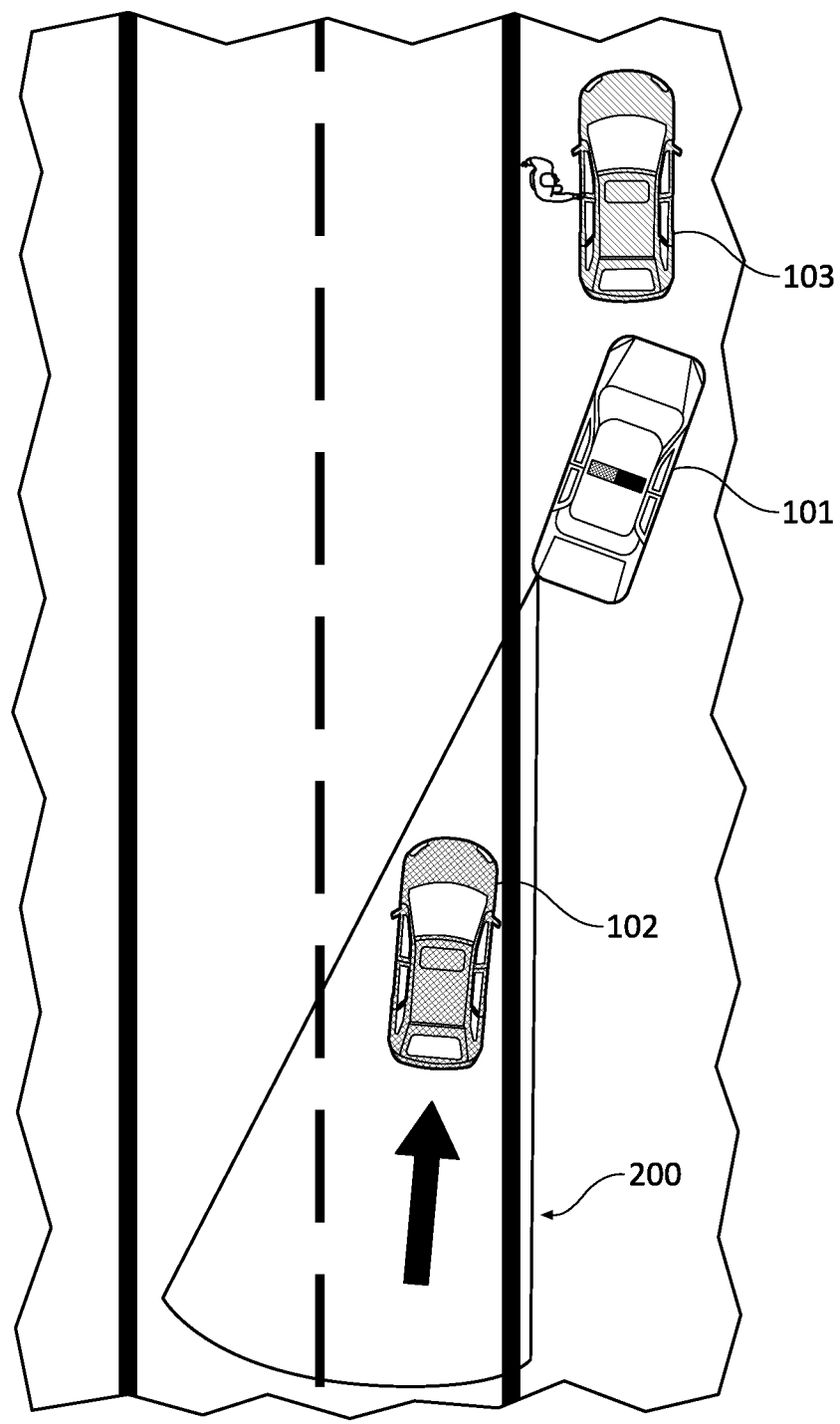
FIG. 2A is a block diagram of a police vehicle and a passing vehicle.

As illustrated in FIG. 2A, a first vehicle 102 may approach an incident location, e.g., a traffic stop location at which a police officer has pulled over yet another vehicle 103), that includes a stopped emergency vehicle 101 such as a police cruiser, whereupon a warning may be provided to or in the vehicle 101, e.g., in circumstances such as described herein, e.g., in time for a vehicle 101 to be moved, for an officer or other pedestrian near the vehicle 101 to take evasion action, for the first vehicle 102 to make an evasive maneuver, or by applying communicating to the second vehicle 102 to provide automatic steering input to the passing second vehicle 102 to help avoid a collision.

Figure 2B:
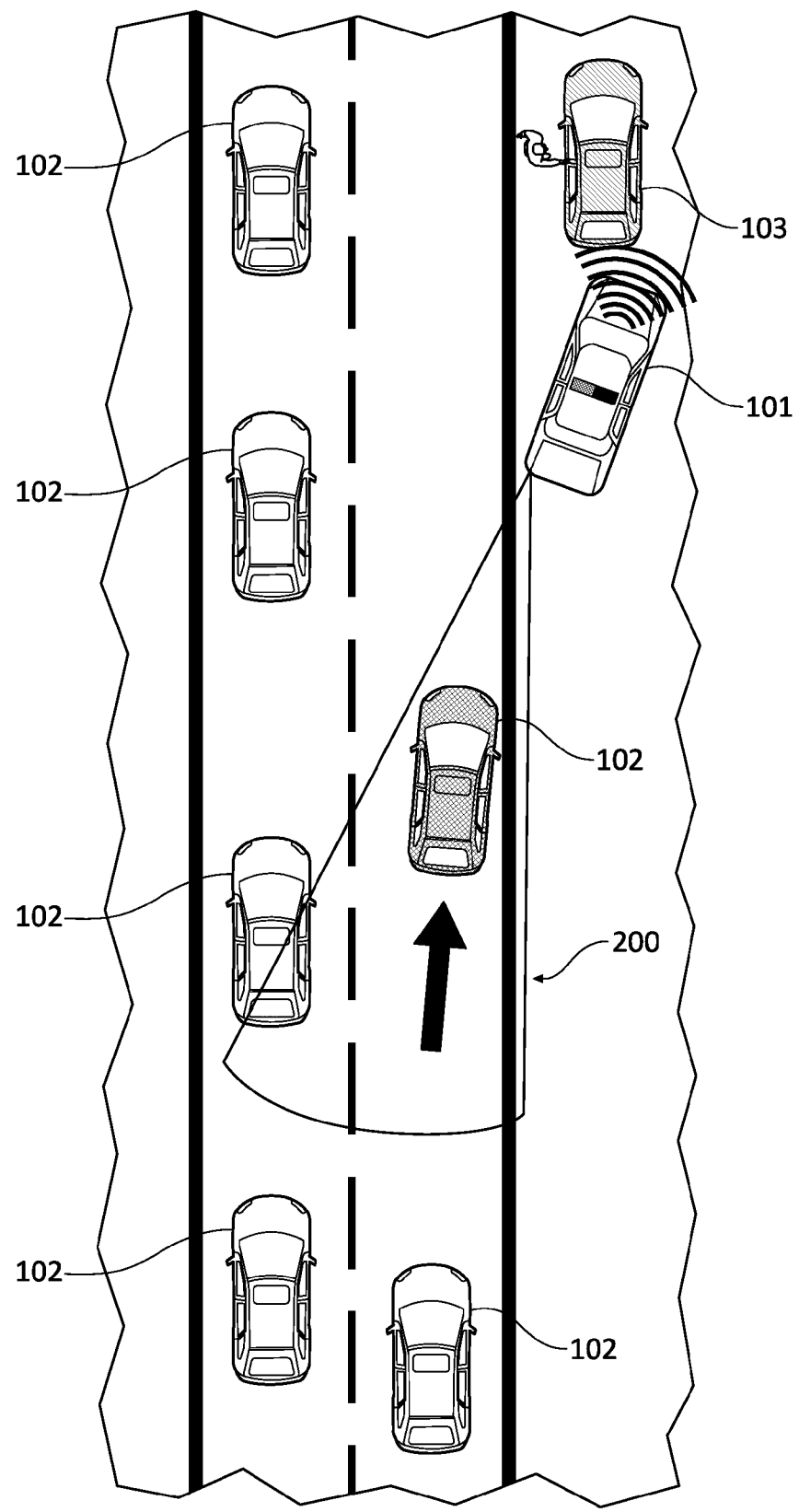
FIG. 2B is a block diagram of a police vehicle and passing vehicles.

FIG. 2B illustrates another example of a first vehicle 102 approaching an incident location. Whereas FIG. 2A illustrates a low traffic density environment, FIG. 2B illustrates a higher traffic density environment, i.e., multiple second vehicles 102 are present near, and passing, the incident location. As disclosed herein, traffic density may be taken into account in determining when a warning concerning a passing vehicle 102 should be provided to or in the vehicle 101. Traffic density may be defined as a number of vehicles in a pre-determined area, possibly within a predetermined period of time. For example, the predetermined area may be an area of a roadway within a predetermined distance (also referred to herein as a "reference" distance), e.g., one-half mile, one mile, etc. of a first vehicle 101. A predetermined period of time (which also may be referred to as a "reference" time) may be a number of seconds, e.g., five seconds, ten seconds, etc. However, the predetermined period of time may be omitted, and traffic density may simply be measured for a given moment in time. Moreover, as disclosed herein the sensitivity of a tracking and/or warning system may be adjusted by adjusting a threshold traffic density for raising an alarm, taking an evasive action, etc. That is, traffic density sensitivity may be defined as a threshold traffic density at which an action such as a warning or evasive maneuver may be taken.

Figure 1:
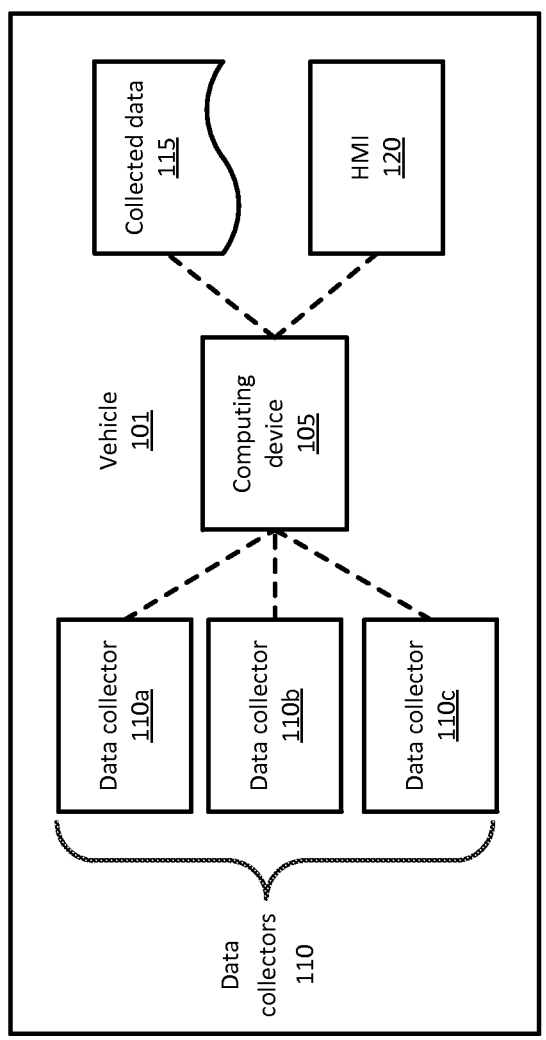
FIG. 1 is a block diagram of an exemplary vehicle.

With reference to FIG. 1, an approach warning system and method as disclosed herein may be deployed and used in vehicles such as the vehicle 101. The system and method are generally in implemented in and/or include a computer 105 in the vehicle 101. The computer 105 generally receives data from one or more data collectors 110, e.g., sensors, deployed in an interior and/or exterior of the vehicle 101. In general, the computer 105 may be equipped to provide information relating to activity in a detection zone 200 (see FIGS. 2A, 2B), i.e., an area typically defined by a distance at which sensors 110 in the vehicle 101 are able to obtain reliable and useful data 115 for the approach warning system and method.

FIG. 1 is a block diagram of an exemplary vehicle 101 equipped for approach detection and warning. The vehicle 101 generally includes one or more sensor data collectors 110, used to detect and identify a vehicle 101, such as a police or other emergency or service vehicle that may be stopped on or near a roadway. When a vehicle 101 is detected on or near the roadway, an occupant of the vehicle 101 can be warned with an audible, visual, and/or haptic signal, and or by output from a device connected to the computer 105 via a wireless technology, e.g., wi-fi, cellular technology, etc. Likewise, vehicle-to-vehicle (V2V) communications could be used so that the driver of the passing vehicle 101 is warned with an audible, visual, and/or haptic signal. Additionally, automatic steering input can be applied to the passing vehicle 102 to guide it toward the lane markings or toward a clear path.

As stated above, a vehicle 101 includes a vehicle computer 105. The vehicle 101 is generally a land-based vehicle having three or more wheels, e.g., a passenger car, light truck, etc. The computer 105 generally includes a processor and a memory, the memory including one or more forms of computer-readable media, and storing instructions executable by the processor for performing various operations, including as disclosed herein. Further, the computer 105 may include and/or be communicatively coupled to more than one computing device, e.g., controllers or the like included in the vehicle 101 for monitoring and/or controlling various vehicle components, e.g., an engine control unit, transmission control unit, etc. The computer 105 is generally configured, i.e., could include hardware and/or software, for communications on a controller area network (CAN) bus or the like. The computer 105 may also have a connection to an onboard diagnostics connector (OBD-II).

Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with other devices via various wired and/or wireless networking technologies, e.g., cellular, Bluetooth, a universal serial bus (USB), wired and/or wireless packet networks, etc.

Data collectors 110 may include a variety of devices. For example, as illustrated in FIG. 1, data collectors 110 can include one or more ultrasonic sensors, cameras, lidar sensors, radar sensors, infrared sensors, etc.

Further, the foregoing examples are not intended to be limiting; other types of data collectors 110 could be used to provide data 115 to the computer 105. For example, various controllers in a vehicle 101 may operate as data collectors 110 to provide data 115 via the CAN bus, e.g., data 115 relating to vehicle 101 speed, acceleration, etc. Further, sensors or the like, global positioning system (GPS) equipment, etc., could be included in a vehicle 101 and configured as data collectors 110 to provide data directly to the computer 105, e.g., via a wired or wireless connection.

A memory of the computer 105 generally stores collected data 115. Collected data 115 may include a variety of data collected in a vehicle 101. Examples of collected data 115 may include measurements relating to a position, velocity, and size (e.g., length, width, height, radar cross section) of target(s) such as a suspect in or near a detection zone 200. Data 115 may additionally include data calculated therefrom in the computer 105. In general, collected data 115 may include any data that may be gathered by a collection device 110 and/or computed from such data.

The vehicle 101 generally includes a human machine interface (HMI) 120. In general, the HMI 120 is equipped to accept inputs for, and/or provide outputs from, the computer 105. For example, the vehicle 101 may include one or more of a display configured to provide a graphical user interface (GUI) or the like, an interactive voice response (IVR) system, audio output devices, mechanisms for providing haptic output, e.g., via a vehicle 101 steering wheel or seat, etc. Further, a user device, e.g., a portable computing device such as a tablet computer, a smart phone, or the like, may be used to provide some or all of an HMI 120 to a computer 105. For example, a user device could be connected to the computer 105 using technologies discussed above, e.g., USB, Bluetooth, etc., and could be used to accept inputs for and/or provide outputs from the computer 105.

Exemplary Operations

Exemplary operations of the computer 105, e.g., collecting and/or using data 115, may include some of all of the following (such operations may be further alternatively and/or additionally described in Appendix A attached hereto):

Sensor(s) (e.g. radar, lidar, video) mounted on the police vehicle 101 determine a distance, speed, and/or trajectory of passing vehicles 102. Alternately or additionally, this data 115 can be determined from a V2V communication system.

If a passing vehicle 102 is on a path toward the police vehicle 101 or is in an adjacent lane, the computer 105 will provide an audible and/or visual warning that can be heard outside the vehicle 101 (e.g. from the horn, siren, or police lights) to warn the vehicle 101 occupant, e.g., a police officer. The warning will be provided at an appropriate time based on a speed of the approaching vehicle 102, the range of vehicle 101 sensors 110, and a typical reaction time such that the police officer or other occupant can react in critical situations and to reduce occurrence of false activations of the computer 105.

If the passing vehicle 102 is on a path toward a pedestrian such as a police officer, an audible chirp from the vehicle 101 horn or police siren can be activated to warn that vehicle 102 and/or the pedestrian.

A traffic density estimator can be used to enable/disable or set the traffic density sensitivity of the warning system. In situations where high traffic density is detected, this estimator may disable the warning or only warn when a passing vehicle 102 is on a collision course. Traffic density can be estimated based on how frequently vehicles 102 pass by (measured by vehicle 101 sensors), time, date, recent traffic observations made by vehicle 101 sensors, or by received traffic data 115, e.g., the computer 105 could receive such data from a remote server via a wireless, e.g., cellular, data connection.

A vehicle 101 could include various types of vehicles, e.g., police cars, police motorcycles, fire trucks, ambulances, construction equipment, sanitation trucks, etc., that frequently stop or drive slowly near traffic.

If a passing vehicle 102 is driving faster than the speed limit, an audible chirp from a siren of a vehicle 101 can be activated to warn the vehicle 102. For this feature, speed limit information from a map would be needed as an input.

The warning system can be enabled or disabled by the vehicle 101 driver or an administrator. It can also be enabled automatically when the vehicle 101 enters a specified state (e.g. every time it comes to a stop).

Exemplary Process Flow

Figure 3:
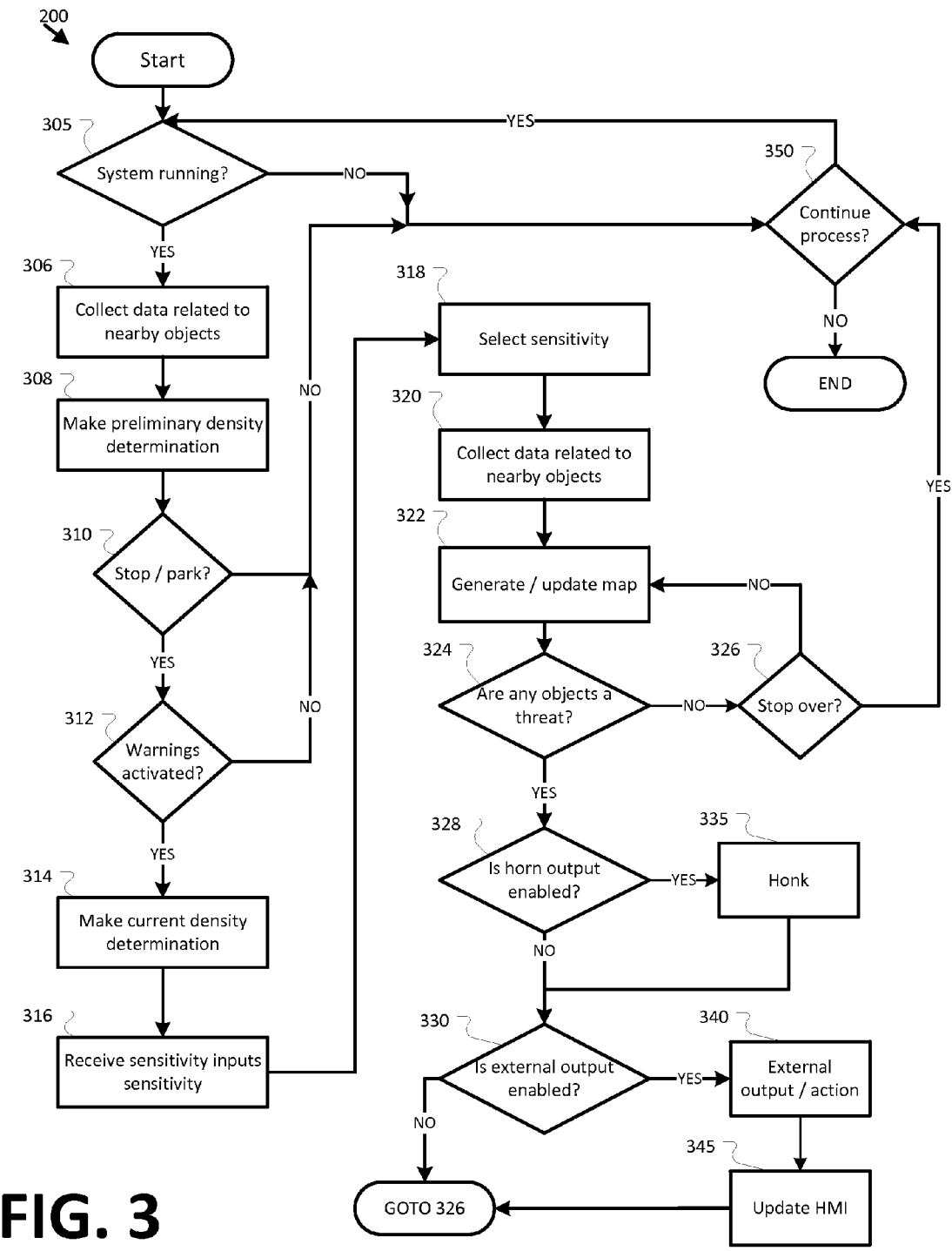
FIG. 3 is a diagram of an exemplary process for vehicle approach detection, warning, and/or action.

FIG. 3 is a diagram of an exemplary process for vehicle approach detection, warning, and/or action. In general, actions performed as part of the process 300 may be performed by the computer 105 in an emergency, e.g., police, vehicle 101, i.e., according to instructions stored in a memory of, and executable by a processor of, the computer 105.

The process 300 begins in a block 305, in which operation of an emergency vehicle alert and/or warning system commences or continues. For example, the computer 105 could be programmed to initiate the process 300 on receiving a user input. Further, alternatively or additionally, the computer 105 could be programmed to begin running the system when a vehicle 101 enters a drive or cruising mode, e.g., a transmission of the vehicle is moved from a "park" state to a "drive" state. If the system has been initiated, then the process 300 proceeds to a block 306. Otherwise, the process 300 proceeds to a block 350.

Next, in a block 306, the computer 105 obtains and/or generates collected data 115 related to nearby objects. For example, collected data 115 may be obtained from one or more data collectors 110, as explained above. Further, collected data 115 may be computed from other data 115 as explained above, obtained directly from a data collector 110. Moreover, collected data 115 may be obtained from a remote source, e.g., a server or the like communicating with the computer 105 via a cellular connection or the like, the server being located in a remote data center, dispatch center, etc. In any event, in the block 306, collected data 115 obtained by the computer 105 may include data 115 such as described above.

Next, in a block 308, the computer 105 makes a preliminary traffic density determination. For example, the computer 105 may determine a number of objects within a predetermined area, e.g., on a roadway within a predetermined distance, e.g., a half mile, a mile, etc., of the vehicle 101. The computer 105 may then count the number of objects determined to be moving vehicles 102, and compute a traffic density that is a number of vehicles 102 within the predetermined area, e.g., 10 vehicles 102 per mile. Further, the computer 105 may make a preliminary evaluation of traffic density, e.g., low, medium, or high, according to predetermined thresholds. For example, less than five cars within a predetermined area, e.g., a mile of roadway, could be considered a low density. 5 to 10 cars within the predetermined area could be considered a medium density. To continue the example, over 10 cars within the predetermined area could be considered a high traffic density. The computer 105 may also take into account an average detected speed of other cars 102 and/or of the vehicle 101 in evaluating traffic density according to thresholds. For example, 10 cars within an area could be considered a low density if vehicles 101, 102 are moving at relatively low speeds, e.g., less than 30 miles per hour, but could be considered a high density if vehicles 101, 102 moving at relatively high speeds, e.g., greater than 60 miles per hour.

In a block 310, the computer 105 determines whether the vehicle 101 has come to a parked position, e.g., stopped and placed in a "park" transmission mode. In some cases, the computer 105 may further determine whether the vehicle 101 has been parked after being in a pursuit mode or the like. In any case, if the determination of the block 310 is affirmative, then a block 312 is executed next. Otherwise, the process 300 proceeds to the block 350.

In the block 312, the computer 105 determines whether the system is permitted to take action, e.g., provide a warning, providing a warning or alert, taking evasive action, e.g., automatically driving forward, backward, to the side, and/or to a location to avoid a collision, etc., upon determining that a vehicle 102 approaching the vehicle 101 presents a risk. For example, user input, e.g. input from a driver or occupant of the vehicle 101 could be provided. Alternatively, the computer 105 could be programmed to automatically permit actions to be taken upon determining a risk from an approaching vehicle 102. If the system is not permitted to take action, then the process 300 proceeds to the block 350. Otherwise, the process 300 proceeds to the block 314.

In the block 314, the computer 105 makes a determination of traffic density. For example, a current traffic density could be determined as described above with respect to the preliminary traffic density.

Following the block 314, in a block 316, the computer 105 receives inputs relevant to determining traffic density sensitivity of the system. For example, an occupant or driver of the vehicle 101 could indicate a sensitivity adjustment, e.g., make the system less sensitive to traffic density by specifying a higher threshold of traffic density than a default threshold to cause an action such as a warning, evasive action, etc. to be taken. Further, the computer 105 could receive data 115 providing other relevant factors, e.g., time of day, ambient light, weather conditions such as presence or absence of fog, precipitation, etc., road conditions, e.g., slippery and/or wet, etc.

Following the block 316, in a block 318, the computer 105 selects a traffic density sensitivity. For example, where traffic density is over a threshold associated with a high traffic density, the system could be set to be sensitive, i.e., respond with a warning and/or evasive action, to approaching vehicles within a first predetermined distance. Further, where traffic density is between thresholds associated with low and high traffic densities, e.g., medium, the system could be set to be moderately sensitive, i.e., respond with a warning and/or evasive action to approaching vehicles within a second predetermined distance that is greater than the first predetermined distance. In a like manner a third predetermined distance greater than the second predetermined distance could be associated with low traffic densities, i.e., traffic densities below a threshold traffic density associated with low densities.

Following the block 318, in a block 320, the computer 105 collects data 115 related to nearby objects, e.g., in a manner described above with respect to the block 306.

Following the block 320, in a block 322, the computer 105 monitors and/or tracks detected nearby objects. For example, the computer 105 generates, or in the case of a second or later iteration of the process 300, updates, a virtual map, discussed further below with respect to the block 322, of the vehicle 102 surroundings. For example, a map update may be performed substantially continuously, e.g., after a predetermined amount of time, e.g., 100 milliseconds, has elapsed since the virtual map was last updated, or, an amount of time that data 115 has been collected, in the case of a first iteration of the process 300. The virtual map may store a vehicle 102 location, speed, an orientation of the vehicle 102 and/or certain vehicle 102 components, e.g., an orientation of vehicle 102 wheels, as well as a vehicle 101 location, a location of other vehicles, e.g., the vehicle 103 and/or other vehicles 102, and/or other targets, as well as "breadcrumbs" or the like indicating movement of one or more objects.

A virtual map of the vehicle 101 surroundings such as is generated or updated in the block 322 generally includes a three-dimensional coordinate system having an origin located with reference to the vehicle 101, e.g., at an intersection of horizontal, longitudinal, and vertical axes of the vehicle 101. Further, the virtual map generally includes an identification and location of objects, e.g., one or more vehicles 102, 103, possibly other objects such as bicycles, pedestrians, etc.

Data 115 from different data collectors 110 may be used by itself or in combination with data from other types of data collectors 110. For example, data 115 from one or more sensors 110 may be used in combination with data 115 from other data collectors 110, e.g. image data 115 from a vehicle 101 camera 110 could be used with radar data 115, lidar data 115, etc. For example, radar data 115 could indicate a likely presence of an object with respect to a vehicle 102, whereupon image data 115 could be used, based on image recognition techniques, to confirm and/or augment identification of the object.

Following the block 322, in a block 324, the computer 105 determines whether any detected objects, including a vehicle 102, but possibly also including other objects such as other vehicles, are a threat to the vehicle 101 and/or a person, e.g., a police officer or emergency worker, standing near the vehicle 101. As explained above, a threat may be determined according to a traffic density sensitivity selected as described above with respect to the block 318. For example, depending on a traffic density sensitivity, and a speed, heading, and/or other characteristics of a vehicle 102. e/g. indicating that the vehicle 102 will pass within a predetermined distance, e.g., 5 meters, of the vehicle 101, i.e. poses a risk of colliding with a vehicle 101 and/or a person or other vehicle near the vehicle 101, a vehicle 102 may be deemed a threat to the vehicle 101. If such threat is detected, then a block 328 is executed next. Otherwise, the process 300 proceeds to a block 326.

In the block 326, the computer 105 determines whether a vehicle 101 stop is over. For example, the vehicle 101 may have been participating in a service stop, emergency stop, traffic ticket stop, etc. When the stop is over, the vehicle 101 may be started, placed into a "drive" transmission mode, etc. If the stop is not over, then the process 300 returns to the block 322. If the stop is over, then the process 300 proceeds to the block 350.

In a block 328, the computer 105 determines whether a vehicle 101 horn is enabled. If so, the process 300 proceeds to a block 335, whereupon the computer 105 causes the vehicle 101 horn to be sounded. Following the block 335, or the block 328, if horn output is not enabled, a block 330 is executed.

In a block 330, the computer 105 determines whether external outputs that may be used for a warning are enabled, e.g., siren, lights, etc. if so, the process 300 proceeds to a block 344 use of such outputs. Otherwise, the process 300 returns to the block 305.

In the block 340, external warnings, such as sirens, lights, etc., on a vehicle 101 are activated.

Following the block 340, in a block 345, a vehicle 101 HMI may be updated, e.g., a display may display a visual warning of a possible collision with a vehicle 101, haptic output may be provided on a vehicle 101 steering wheel, audio output may be provided, etc. Further, it is possible that the computer 105 may exert a control action on the vehicle 101, e.g., related to steering, lane keeping, braking, etc. Following the block 345, the process 300 returns to the block 305.

Possibly following the block 305, in addition to the block 320 discussed above, is a block 350, wherein is determined whether the process 300 should continue. For example, if the computer 105 is powered off, an operator has provided input to cease collecting data 115 relating and/or to cease vehicle 101 operations, etc., the process 300 may end. If such determination is not made, the process 300 returns to the block 305.

CONCLUSION

The term "police" as used herein may refer to various public and/or private law enforcement and/or security operations, in addition to referring to a formal police department.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer that includes a processor and a memory, wherein the computer is programmed to:
    collect data related one or more objects proximate to a first vehicle, the one or more objects including a second vehicle;
    use the collected data to generate a virtual map of the one or more objects including the second vehicle;
    determine that the second vehicle is likely to pass within a reference distance of the first vehicle, wherein the reference distance is established by comparing a current traffic density to a predetermined traffic density threshold such that the predetermined distance is a first value if the current traffic density is greater than the traffic density threshold and is a second value if the current traffic density is less than the traffic density threshold, wherein the first value is less than the second value; and
    initiate an action based on the determination that the second vehicle is likely to pass within the reference distance of the first vehicle.

2. The system of claim 1, wherein the computer is further programmed to adjust the traffic density threshold based on an average speed of a plurality of vehicles in a predetermined area that includes the first vehicle.

3. The system of claim 1, wherein the computer is further programmed to collect the data related one or more object when the vehicle is in a drive mode.

4. The system of claim 3, wherein the computer is further programmed to:
    detect that the vehicle has transitioned from the drive mode to a park mode;
    continue collecting the data related one or more object; and
    determine that the second vehicle is likely to pass within the reference distance of the first vehicle based at least in part on at least one datum collected after the first vehicle has transitioned to the park mode.

5. The system of claim 4, wherein the computer is further programmed to adjust the traffic density threshold based at least in part on at least one datum collected after the first vehicle has transitioned to the park mode.

6. The system of claim 1, wherein the action includes at least one of actuating at least one vehicle light, actuating a vehicle siren, actuating a vehicle horn, changing a first vehicle speed, and changing a first vehicle direction.

7. The system of claim 1, wherein the collected data includes a position of the second vehicle.

8. The system of claim 1, wherein the collected data includes at least one of ultrasonic, image, radar, lidar, and infrared data.

9. The system of claim 1, wherein the computer is further programmed to provide information to a remote device based on the collected data.

10. The system of claim 1, wherein the computer is further programmed to adjust the reference distance upon detecting a change in the traffic density.

11. A method, comprising:
collecting data related one or more objects proximate to a first vehicle, the one or more objects including a second vehicle;
using the collected data to generate a virtual map of the one or more objects including the second vehicle;
determining that the second vehicle is likely to pass within a reference distance of the first vehicle, wherein the reference distance is established by comparing a current traffic density to a predetermined traffic density threshold such that the reference distance is a first value if the current traffic density is greater than the traffic density threshold and is a second value if the current traffic density is less than the traffic density threshold, wherein the first value is less than the second value; and
initiating an action based on the determination that the second vehicle is likely to pass within the reference distance of the first vehicle.

12. The method of claim 11, further comprising adjusting the traffic density threshold based on an average speed of a plurality of vehicles in a predetermined area that includes the first vehicle.

13. The method of claim 11, further comprising collecting the data related one or more object when the vehicle is in a drive mode.

14. The method of claim 13, further comprising:
detecting that the vehicle has transitioned from the drive mode to a park mode;
continuing collecting the data related one or more object; and
determining that the second vehicle is likely to pass within the reference distance of the first vehicle based at least in part on at least one datum collected after the first vehicle has transitioned to the park mode.

15. The method of claim 14, further comprising adjusting the traffic density threshold based at least in part on at least one datum collected after the first vehicle has transitioned to the park mode.

16. The method of claim 11, wherein the action includes at least one of actuating at least one vehicle light, actuating a vehicle siren, actuating a vehicle horn, changing a first vehicle speed, and changing a first vehicle direction.

17. The method of claim 11, wherein the collected data includes a position of the second vehicle.

18. The method of claim 11, wherein the collected data includes at least one of ultrasonic, image, radar, lidar, and infrared data.

19. The method of claim 11, further comprising providing information to a remote device based on the collected data.

20. The method of claim 11, further comprising adjusting the reference distance upon detecting a change in the traffic density.

\* \* \* \* \*